US011356363B2

(12) United States Patent
Tsirkin (10) Patent No.: US 11,356,363 B2
(45) Date of Patent: Jun. 7, 2022

(54) LOCATION CHANGE NOTIFICATION HANDLING (71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 221 days.

(21) Appl. No.: 16/831,256

(22) Filed: Mar. 26, 2020

(65) Prior Publication Data

US 2021/0306258 A1   Sep. 30, 2021

(51) Int. Cl.
*H04L 12/717* (2013.01)
*H04L 12/755* (2013.01)
*H04L 12/741* (2013.01)
*G06F 9/54* (2006.01)
*G06F 9/455* (2018.01)
*H04L 12/26* (2006.01)
*H04L 45/42* (2022.01)
*H04L 45/021* (2022.01)
(Continued)

(52) U.S. Cl.
CPC .......... *H04L 45/42* (2013.01); *G06F 9/45558* (2013.01); *G06F 9/542* (2013.01); *H04L 43/067* (2013.01); *H04L 45/021* (2013.01); *H04L 45/74* (2013.01); *G06F 2009/45595* (2013.01)

(58) Field of Classification Search
CPC ....... H04L 45/42; H04L 45/021; H04L 45/74; H04L 45/72; H04L 43/067; H04L 47/32; G06F 9/45558; G06F 9/542; G06F 9/45541; G06F 2009/45595
See application file for complete search history.

(56) References Cited

U.S. PATENT DOCUMENTS

| 7,596,101 B2 * | 9/2009 | Oguchi | H04L 45/04 370/256 |
| 7,660,305 B1 * | 2/2010 | Wiget | H04L 47/32 370/392 |

(Continued)

FOREIGN PATENT DOCUMENTS

| CN | 103209092 B | 3/2016 |
| RU | 2551814 C2 | 5/2015 |

OTHER PUBLICATIONS

MAC Table Aging, © 1999-2020 Juniper Networks, Inc., https://www.juniper.net/documentation/en_US/junos/topics/topic-map/mac-table-aging.html (5 pages), Dec. 10, 2019.

(Continued)

*Primary Examiner* — Habte Mered
(74) *Attorney, Agent, or Firm* — KL&L Gates LLP (57) ABSTRACT

A method includes receiving a message at a network bridge from a computer system where the network bridge stores a forwarding table. The method also includes determining a type of the message. The method also includes upon a determination that the type of message is a network notification message, determining whether data within the message corresponds to an entry within the forwarding table. The method also includes upon determining that the data within the message corresponds to the entry within the forwarding table, halting a transmission of the message. The method also includes upon determining that the data within the message does not correspond to the entry in the forwarding table, transmitting the message to a device in communication with the network bridge.

17 Claims, 4 Drawing Sheets

(51) Int. Cl.
    *H04L 45/74*     (2022.01)
    *H04L 43/067*     (2022.01)

(56) References Cited

U.S. PATENT DOCUMENTS

| | | | |
|---|---|---|---|
| 8,045,554 B2 | 10/2011 | Kim et al. | |
| 9,628,439 B2 | 4/2017 | Eastlake, III | |
| 2006/0013221 A1* | 1/2006 | De Cnodder | H04L 49/351 370/389 |
| 2012/0158992 A1* | 6/2012 | Lam | H04L 61/6068 709/238 |
| 2012/0300783 A1* | 11/2012 | Chen | H04L 41/12 370/395.5 |
| 2014/0289193 A1 | 9/2014 | Zhou et al. | |
| 2015/0163151 A1* | 6/2015 | Li | H04L 41/044 370/236 |
| 2016/0350144 A1* | 12/2016 | Lu | G06F 9/45558 |
| 2017/0142008 A1* | 5/2017 | Yoo | H04L 45/48 |

OTHER PUBLICATIONS

Understanding Spanning-Tree Protocol Topology Changes, © 2019 Cisco and/or its affiliates, https://www.cisco.com/c/en/US/support/docs/lan-switching/spanning-tree-protocol/12013-17.html (9 pages), 2019.

\* cited by examiner

LOCATION CHANGE NOTIFICATION HANDLING

BACKGROUND

A computer network may include various combinations of computer systems and hardware linked through communication hardware, where the computer systems may include bare metal systems and virtual machines. Generally, network topology continually changes as computer systems and hardware are moved, re-tasked, and/or reconfigured for new purposes. For example, a computer system may be physically moved to a different location to support a new business unit.

SUMMARY

The present disclosure provides new and innovative systems and methods for handling location change notifications. In an example, a method includes receiving a message at a network bridge from a computer system where the network bridge stores a forwarding table. The method also includes determining a type of the message. The method also includes upon a determination that the type of message is a network notification message, determining whether data within the message corresponds to an entry within the forwarding table. The method also includes upon determining that the data within the message corresponds to the entry within the forwarding table, halting a transmission of the message. The method also includes upon determining that the data within the message does not correspond to the entry in the forwarding table, transmitting the message to a device in communication with the network bridge.

In an example, a system includes a computer system and a network bridge in communication with the computer system. The network bridge includes a memory, a processor, and also stores a forwarding table. The system also includes a device in communication with the network bridge. The system also includes computer-executable logic encoded in the memory of the network bridge. The computer-executable program logic is configured for the execution of receiving a message from the computer system. The computer-executable program logic is also configured for the execution of determining a type of the message. The computer-executable program logic is also configured for the execution of upon a determination that the type of message is a network notification message, determining whether data within the message corresponds to an entry within a forwarding table. The computer-executable program logic is also configured for the execution of upon determining that the data within the message corresponds to the entry within the forwarding table, halting a transmission of the message. The computer-executable program logic is also configured for the execution of upon determining that the data within the message does not correspond to the entry in the forwarding table, transmitting the message to the device.

In an example, a non-transitory machine readable medium storing code, which when executed by a processor is configured to receive a message at a network bridge from a computer system where the network bridge stores a forwarding table. The code, when executed by a processor, is also configured to determine a type of the message. The code, when executed by a processor, is also configured to upon a determination that the type of message is a network notification message, determine whether data within the message corresponds to an entry within the forwarding table. The code, when executed by a processor, is also configured to upon determining that the data within the message corresponds to the entry within the forwarding table, halt a transmission of the message. The code, when executed by a processor, is also configured to upon determining that the data within the message does not correspond to the entry in the forwarding table, transmit the message to a device in communication with the network bridge.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for reducing resource usage and network traffic caused by location change notifications. The current disclosure describes systems and methods of adding intelligence to network hardware to handle broadcast messages related to location change sent throughout a network and limiting their effect to localized portions of the network that are actually affected by information in the broadcast message. Specifically, while every endpoint and piece of network hardware may receive and attempt to process a broadcast message, not every endpoint and piece of network hardware needs the information. Thus, limiting distribution of location change notifications to effected hardware and endpoints will reduce resource usage and network traffic across the network.

Typically, a local area network (LAN) includes various network hardware and endpoint devices. Network hardware includes devices such as network bridges and network switches. Endpoint devices include physical and virtual devices that are connected to the LAN and communicate across the network. Generally, an endpoint device includes desktop computers, laptops, smartphones, tablets, printers, Internet of Things (IoT) devices, or other specialized hardware like point of service (POS) terminals or retail kiosks, which act as an endpoint device in/on a LAN. As technology progresses, endpoint devices also include virtual devices, such as virtual machines (VMs) hosted on physical servers.

Traditionally, when an endpoint is moved, network hardware within the LAN need to be updated with the latest location information for the endpoint. Generally, the endpoint sends out a broadcast message signaling that the network topology has changed. As the broadcast message is sent to every network device and endpoint on the LAN, each device and endpoint processes the broadcast message and continues the transmission of the broadcast message. Typically, every piece of network hardware updates their forwarding tables and each endpoint uses resources to receive and process the message. Endpoint processing also applies to virtual endpoints, each of which may be activated to receive and process each broadcast message. In some instances, processing broadcast messages can be problematic as a single server can host hundreds, or more, VMs. As such, server and network resources may be diverted from potentially vital tasks to update physical and virtual endpoints that may or may not require information from a broadcast message.

As described in various examples disclosed herein, to reduce resource usage and network traffic due to location change notifications, the systems and methods disclosed herein advantageously control propagation of location change notifications within network hardware, such as network bridges and network switches. While a broadcast message is used for notifying each piece of network hardware and endpoints of a change in location of an endpoint, not every piece of network hardware and endpoint that receives the message benefits from the information. The affected network hardware and endpoints may be localized around the new location of an endpoint. As such, if network hardware intelligently handles each broadcast message, network traffic may be reduced and computing resources may be conserved.

In most examples, network hardware, such as a network switch or network bridge, connect endpoints to other endpoints and other network hardware. Each piece of network hardware includes a forwarding table containing information about surrounding network hardware and endpoints, such as MAC address and associated port. In some examples, an associated port indicates which part of a network an endpoint may be located, with respect to network hardware. An endpoint is a virtual or bare-metal device connected to a network and configured to communicate to other devices on the network. In many examples, an endpoint is either a bare-metal device or a virtual device, such as a virtual machine. A virtual machine is an emulation of a bare-metal device that is managed by a hypervisor installed on a server. Each endpoint may be associated with a hardware address which is used by network hardware to locate an endpoint within a network.

When an endpoint is moved from a first location to a second location within a network, the endpoint sends a network notification message signaling the move because the network hardware does not know of the move until the endpoint notifies the network hardware. When the network notification message arrives at the network hardware, the network hardware determines whether an entry within its own forwarding table already includes the information within the network notification message. If the entry already contains the information, then the broadcast message can be halted at that specific network hardware because the information within the entry did not change with respect to the network hardware. In contrast, if the information within the network notification message is not in the forwarding table or is different than the information within the network notification message, the network notification message is forwarded from the network hardware. In some instances, a forwarding table contains a source IP address and an arrival port. In these instances, the arrival port corresponds to a port from which messages are expected to be received from the endpoint located at the source IP address.

In various examples, the forwarding table may be extended with additional information. An entry may additionally keep a re-transmit counter, or any other form of keeping track of past broadcasts, where broadcasts with a counter higher than what is currently contained within a forwarding table would be allowed to update the network hardware and allowed to be broadcast and passed along to other devices connected to the network hardware. In some examples, network hardware may retain a timing value enabling the network hardware to update and forward broadcast network notification messages when a threshold difference in time from the retained timing value is exceeded.

In some examples, network hardware may include an aging function to manage entries within a forwarding table. If a maximum threshold of time has elapsed, the network hardware will "forget" old locations and/or MAC addresses. In these instances, a received network notification message will be used and forwarded, even when matching currently held information, when the elapsed time since a previous update has exceeded a maximum threshold of time.

Figure 1:
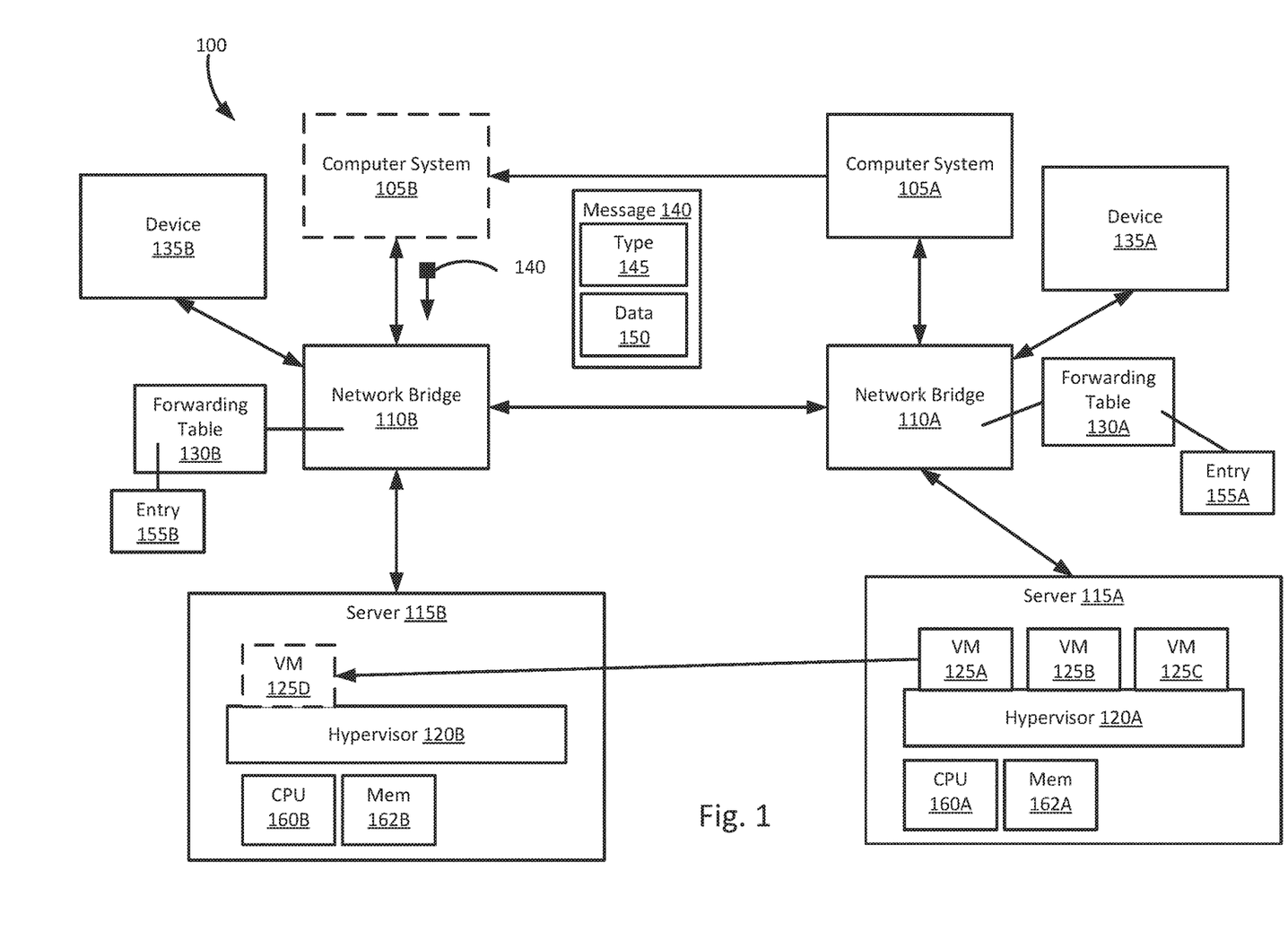
FIG. 1 illustrates a block diagram of a network device within a topology of a network, in accordance with an example embodiment of the present disclosure.

FIG. 1 is a simplified block diagram of a topology of a network, in accordance with an embodiment of the present disclosure. The network 100 includes network bridge 110A and network bridge 110B. Each of the network bridges 110A, 110B includes a forwarding table 130A, 130B respectively. Network bridge 110A is in communication with computer system 105A, device 135A, server 115A, and network bridge 110B. Similarly, network bridge 110B is in communication with device 135B, server 115B, and network bridge 110A. Both servers 115A and 115B include a hypervisor 120A, 120B. Server 115A includes CPU 160A and memory 162A. Server 115B includes 160B and memory 162B. In this instance, Server 115A includes virtual machines (VMs) 125A, 125B, 125C.

In this example, when an endpoint moves locations within the network 100, the endpoint updates other devices and endpoints as to the move. For example, in one instance, VM 125A moves and becomes VM 125D. When VM 125D starts up, VM 125D sends a broadcast message 140, which is a network notification message, indicating that a change in topology of the network 100 has occurred. The network bridge 110B receives the message 140 and determines whether the message 140 corresponds to information within forwarding table 130B. If data 150 within message 140 does not correspond to the information within forwarding table 130B, the network bridge 110B updates forwarding table 130B and forwards the message 140 to device 135B, server 115B, and network bridge 110A. The forwarding table 130B does not include information corresponding to the message 140 because Network bridge 110B does not know that computer system 105A moved to the location of computer system 105B. As such, Network bridge 110B broadcasts the message 140 to notify each device connected to network bridge 110B of the change. When the network bridge 110B continues to broadcast the message 140, the message 140 continues to be propagated throughout the network 100 until the message 140 reaches a network device where the information within its own forwarding table corresponds to the data 150 within the message 140.

If data 150 within message 140 does correspond to the information within forwarding table 130B, the network bridge 110B does not forward the broadcast message 140. The broadcast message 140 is not forwarded because the network bridge 110B already knows about the change in location of computer system 105A to computer system 105B. In this situation, any message for computer system 105B reaching network bridge 110B will use the entry 155B within the forwarding table 130B to properly route the message to computer system 105B. The network bridge 110B reaches this state if the network bridge 110B already received a broadcast message updating the entry 155B within the forwarding table 130B.

Figure 2:
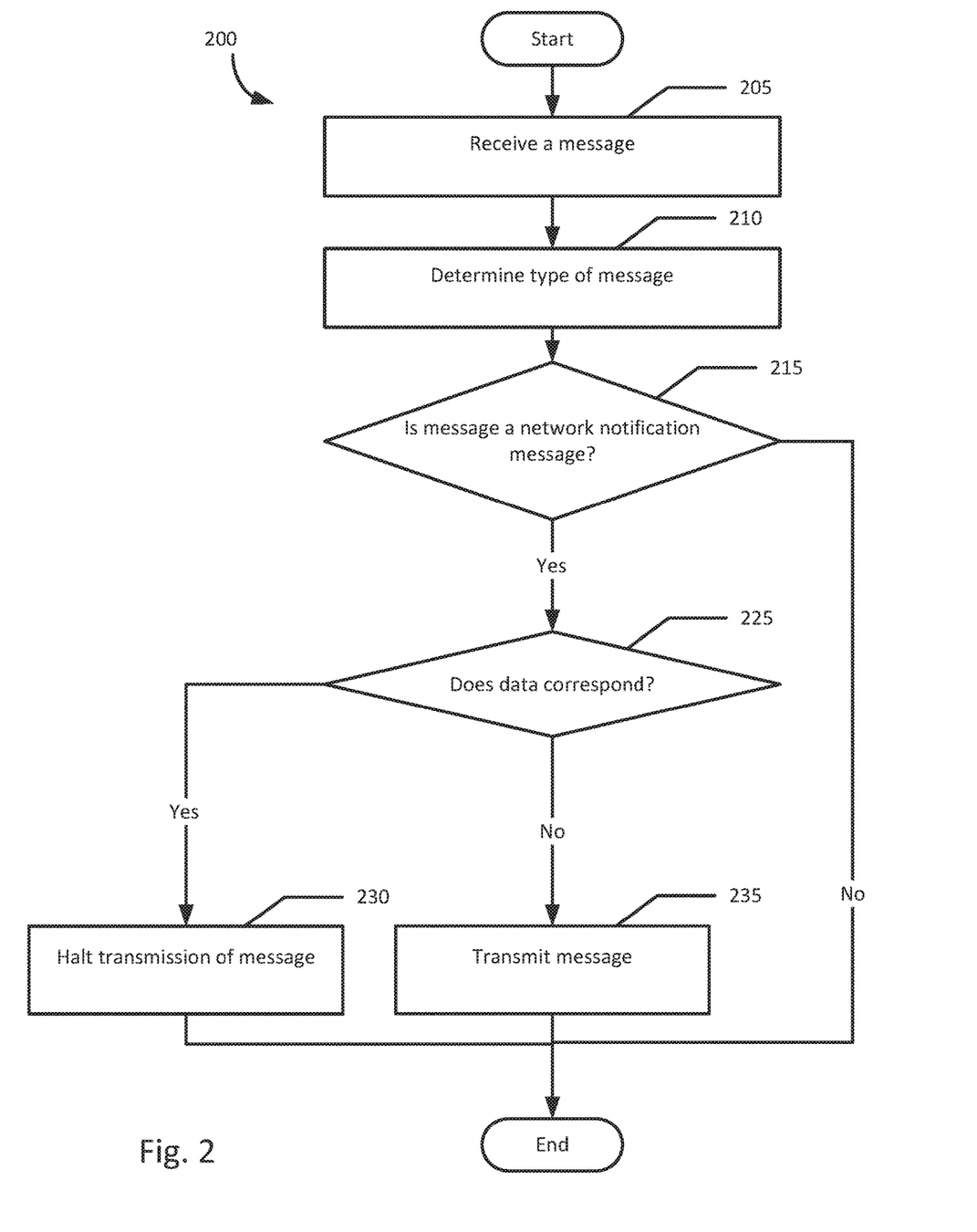
FIG. 2 illustrates a flowchart of an example method for reducing resource usage and network traffic due to broadcast messages, in accordance with an example embodiment of the present disclosure.

FIG. 2 illustrates a flowchart of an example method 200 for reducing resource usage and network traffic due to broadcast messages, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks descried are optional. The method 200 may be performed by processing logic that may comprise hardware (circuitry, dedicated logic, etc.), software, or a combination of both.

The example method 200 includes receiving a message (block 205). For example, when computer system 105A moves to the location of computer system 105B and becomes computer system 105B, computer system 105B broadcasts a message 140 to update each network device and endpoint within the network 100 that computer system 105B was previously computer system 105A. In this case, network bridge 110B receives the message 140. The example method 200 includes determining a type of the message (block 210). For example, the network bridge 110B determines the type 145 of the message 140 to determine how to process the message 140. The method 200 includes querying if the message is a network notification message (block 215). For example, if the network bridge 110B determines that the message 140 is a network notification message, the network bridge 110 further processes the message. However, if the network bridge 110B determines that the message 140 is not a network notification message; the network bridge 110B may propagate the broadcast message. In various instances, a message 140 includes a type 145 and data 150. In some instances, the type may be a bit or a flag within a message. In various examples, a type 145 of a message 140 may be a network notification message.

The example method 200 includes querying whether the data within a message does correspond to an entry within a forwarding table (block 225). For example, upon determining that the message 140 is a network notification message, network bridge 110B determines whether the data 150 within the message 140 corresponds to an entry within the forwarding table 130B. In some instances, the network bridge 110B may compare an entry within the forwarding table 130B to a source address and arrival port within data 150 of the message 140. In these instances, if the source address and arrival port of the message 140 correspond to an entry within the forwarding table 130B, the data 150 within message 140 corresponds to the forwarding table 130B.

The example method 200 also includes upon determining the data does correspond, halting the transmission of the message (block 230). For example, if a network bridge 110B determines that the data 150 corresponds to an entry within the forwarding table 130B, this indicates that the forwarding table 130B already includes the information within data 150 and does not need to be updated. In this instance, the message would not require propagation beyond network bridge 110B as network 110B would already know about the movement of computer system 105B. The example method 200 includes upon determining the data does not correspond, transmitting the message (block 235). For example, if a network bridge 110B determines that the data 150 does not correspond to an entry within the forwarding table 130B, this indicates that the forwarding table 130B does not include the information within data 150 and does not have routing information for computer system 105B incorporated within the forwarding table 130B. In this instance, the network bridge 110B would also forward the message 140 to device 135B, server 115B, and network bridge 110A. Further, just as network bridge 110B processed the message 140, each of the endpoints and network devices would process the message 140. In most instances, a network bridge would process the message 140 similar to network bridge 110B. However, with regards to endpoints, they are merely determining whether a received message is for the respective endpoint.

In various examples, the message may be a reverse address resolution protocol (RARP) message. For example, in one example, the RARP message may include an invalid address as a destination address. In some examples, the determining that the data within the message corresponds to the entry within the forwarding table may include determining whether the amount of time elapsed does not exceed a threshold time. For example, data 150 within message 140 may correspond to an entry within forwarding table 130B. However, in some instances, the network bridge 110B stores information related to how long since each entry within the forwarding table 130B has been updated. If the time elapsed since the last update exceeds a threshold time, the network bridge 110B may still transmit the network notification message. In some examples, determining that data within a message corresponds to an entry within the forwarding table may include whether a counter within the forwarding table does not exceed the counter within the data. For example, when the network bridge 110B compares data 150 from message 140 to an entry within the forwarding table 130B, the network bridge 110B may store a counter indicating whether the stored entry within the forwarding table 130B is more recent than the data 150 within the message 140. If the counter in data 150 exceeds the counter associated with the corresponding entry within the forwarding table 130B, the data 150 includes more recent information. Similarly, if the counter is associated with the corresponding entry within the forwarding table 130B, the corresponding entry within the forwarding table 130B is more up to date and should not be updated with data 150.

Figure 3:
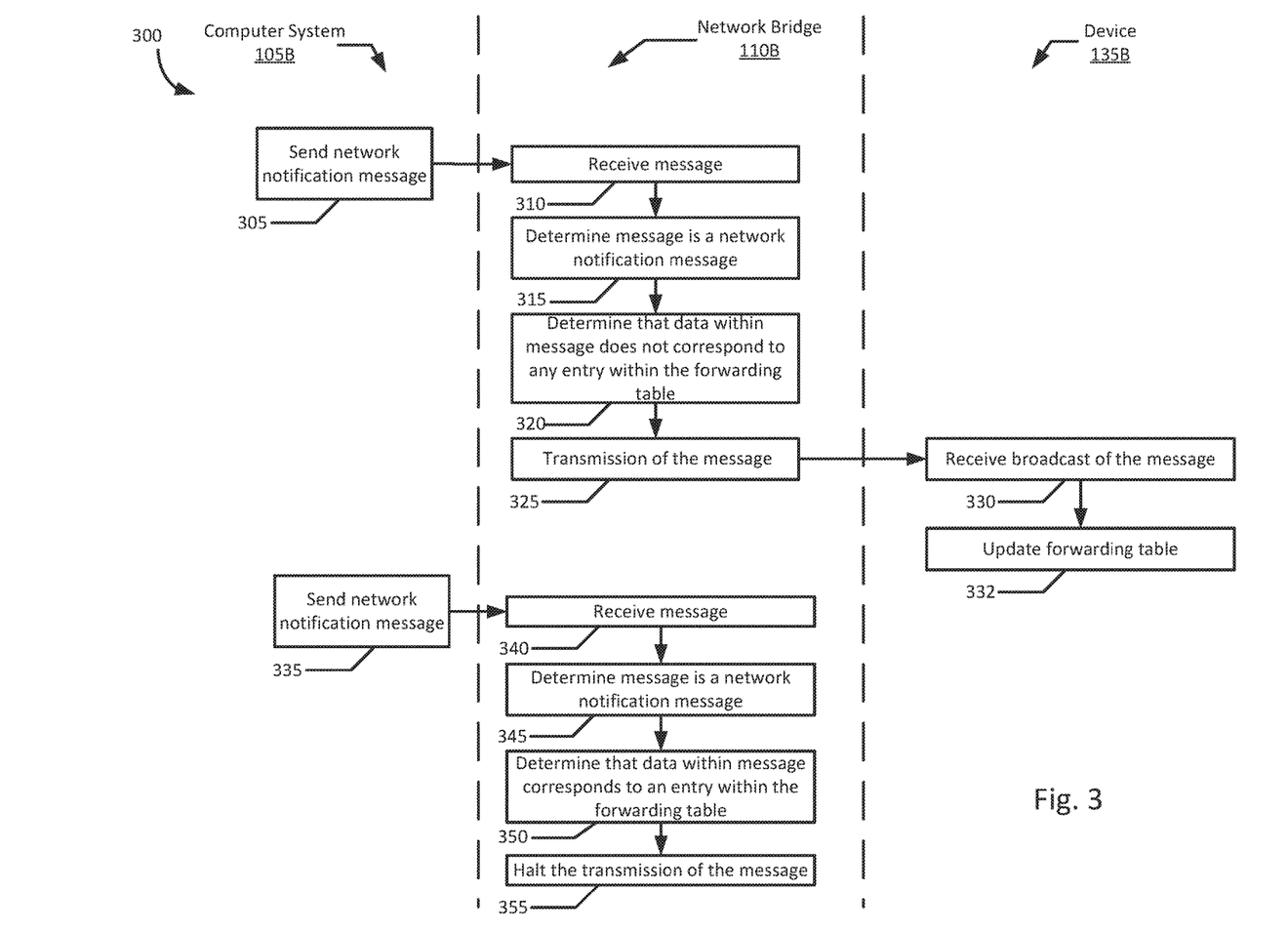
FIG. 3 illustrates a flow diagram of an example method of propagating a broadcast message within a network, in accordance with an embodiment of the present disclosure.

FIG. 3 illustrates a flow diagram of an example method 300 propagating a broadcast message within a network, in accordance with an example embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, network bridge 110B is in communication with computer system 105B and device 135B during processing of broadcast messages.

As shown, computer system 105B has been moved from the location of computer system 105A (as illustrated in FIG. 1) and sends the network notification message 140 to the network bridge 110B (block 305). The network bridge 110B receives the message 140 (block 310) and determines that the type 145 of the message 140 is a network notification message (block 315). The network bridge 110B determines that the data 150 within the message 140 does not correspond to any entry within the forwarding table 130B (block 320). As such, the network bridge 110B updates or adds an entry 155B within the forwarding table 130B including the data 150 within message 140 and transmits the message 140 to device 135B (block 325). Device 135B receives the broadcast of the message 140 (block 330). Device 135B updates its internal forwarding table with the information within message 140 (block 332). In various examples, device 135B may be a network device, such as a network switch or a network bridge. In some examples, device 135B may be an endpoint, such as a computer system or a virtual machine.

If the computer system 105B has been moved within the network 100, but still maintains the same connection with network bridge 110B, the computer system 105B would still send a network notification message 140 (block 335). The network bridge 110B receives the message 140 (block 340) and determines that the message 140 is a network notification message (block 345). The network bridge 110B then determines, in method 300, that the data 150 within the message 140 corresponds to an entry 155B within the forwarding table 130B. As such, the network bridge 110B already knows where to send received messages directed towards the computer system 105B. As the entry 155B already has the most recent data 150 from computer system 105B, the network bridge 110B halts the transmission of the message 140. Thus, device 135B is not updated based on the message sent at block 335, which advantageously allows device 135B to reduce overhead, which may keep latencies lower, reduce power consumption, and reduce unnecessary network traffic.

Figure 4:
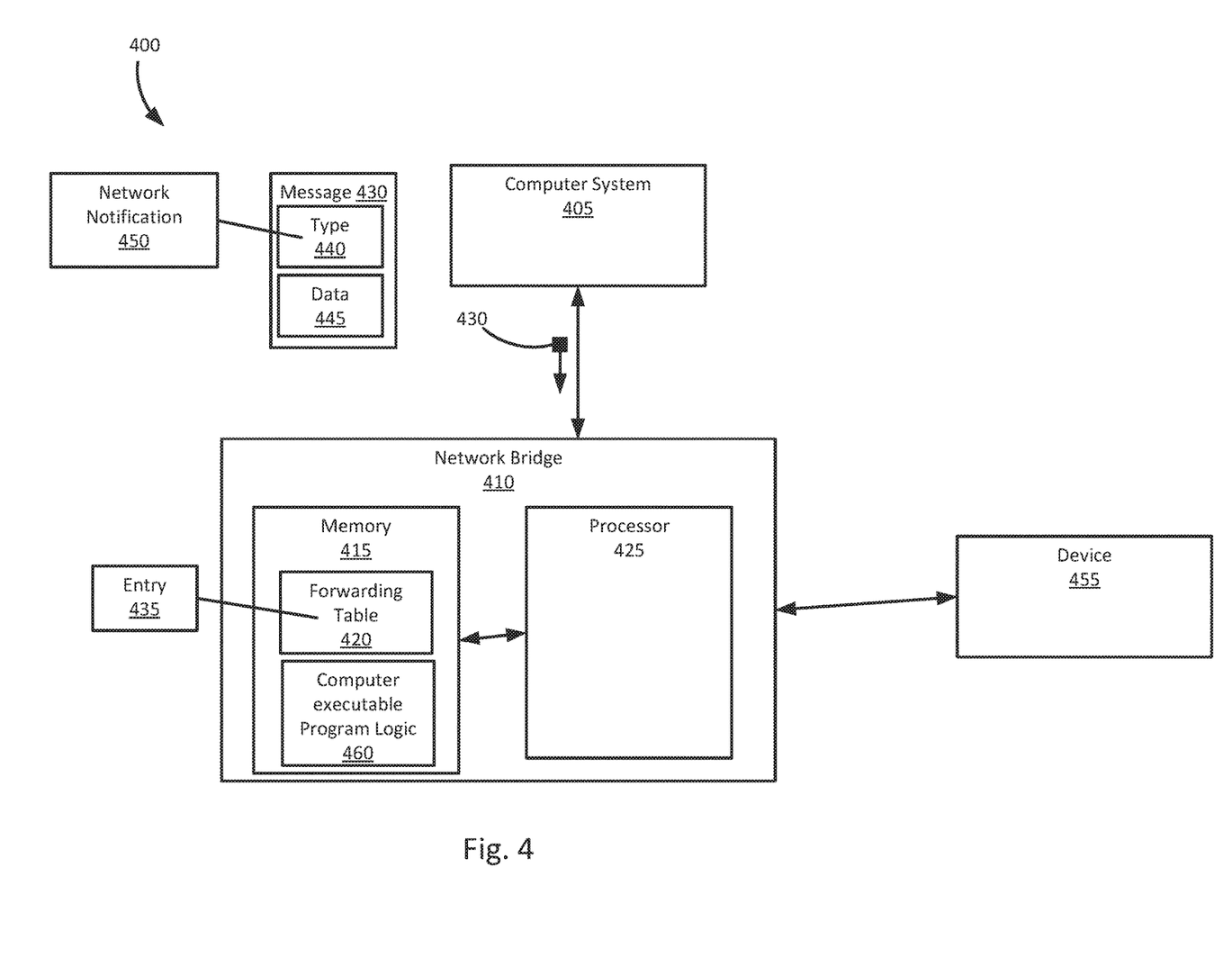
FIG. 4 illustrates a block diagram of an example system for propagating broadcast messages within a network, in accordance with an embodiment of the present disclosure.

FIG. 4 is a block diagram of a system 400 including an example of a computer system 405 sending a network notification broadcast message 430 to a network bridge 410. The network bridge 410 is in communication with the computer system 405 and a device 455. The network bridge 410 includes memory 415 and a processor 425. The memory 415 stores a forwarding table 420. Computer executable program logic 460 encoded within memory 415 is configured for the execution of receiving a message 430 from the computer system 405. The computer-executable program logic is further configured for the execution of determining a type 440 of the message 430. Upon determining that the type 440 of the message 430 is network notification 450, the network bridge 410 determines whether the data 445 within the message 430 corresponds to an entry 435 within the forwarding table 420. Upon a determination that the data 445 within the message 430 corresponds to the entry 435 within the forwarding table 420, the network bridge 410 halts transmission of the message 430. Upon a determination that the data 445 within the message 430 does not correspond to the entry 435 within the forwarding table 420, the network bridge 410 transmits the message 430 to device 455.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a non-transitory machine readable medium storing code, which when executed by a processor is configured to receive a message at a network bridge from a computer system, wherein the network bridge stores a forwarding table; determine a type of the message; upon a determination that the type of message is a network notification message, determine whether data within the message corresponds to an entry within the forwarding table; upon determining that the data within the message corresponds to the entry within the forwarding table, halt a transmission of the message; and upon determining that the data within the message does not correspond to the entry in the forwarding table, transmit the message to a device in communication with the network bridge.

In a 2nd exemplary aspect of the present disclosure, which may be used in combination with any one of more of the preceding aspects (i.e., the 1st aspect), the message is a broadcast message including an invalid address as a destination address.

In a 3rd exemplary aspect of the present disclosure, which may be used in combination with any one of more of the preceding aspects (i.e., the 1st aspect), where determining whether data within the message corresponds to the entry within the forwarding table includes comparing the entry within the forwarding table with a source address and arrival port associated with the message, wherein if the source address and the arrival port correspond to the entry within the forwarding table, the data within the message corresponds to the forwarding table.

In a 4th exemplary aspect of the present disclosure, which may be used in combination with any one of more of the preceding aspects (i.e., the 1st aspect), the computer system is a virtual machine.

In a 5th exemplary aspect of the present disclosure, which may be used in combination with any one of more of the preceding aspects (i.e., the 1st aspect), the network bridge is a switch.

In a 6th exemplary aspect of the present disclosure, which may be used in combination with any one of more of the preceding aspects (i.e., the 1st aspect), where determining that the data within the message corresponds to the entry within the forwarding table comprises determining whether the amount of time elapsed does not exceed a threshold time.

In a 7th exemplary aspect of the present disclosure, which may be used in combination with any one of more of the preceding aspects (i.e., the 1st aspect), where determining that the data within the message corresponds to the entry within the forwarding table comprising whether a counter within the forwarding table does not exceed the counter within the data.

In a 8th exemplary aspect of the present disclosure, which may be used in combination with any one of more of the preceding aspects (i.e., the 1st aspect), where the code, when executed by a processor, is further configured to receive a second message at the network bridge from a second computer system; determine whether the second message is a network notification message; upon a determination that the second message is a network notification message, determine whether data within the second message corresponds to a second entry within the forwarding table; upon determining that the data within the second message corresponds to the second entry within the forwarding table, halt a transmission of the second message; and upon determining that the data within the second message does not correspond to the second entry in the forwarding table, transmit the second message to the device in communication with the network bridge.

In a 9th exemplary aspect of the present disclosure, which may be used in combination with any one of more of the preceding aspects (i.e., the 1st aspect), where the computer system sends the message when moved from a first location to a second location with respect to the network bridge.

In a 10th exemplary aspect of the present disclosure, which may be used in combination with any one of more of the preceding aspects (i.e., the 1st aspect), where the device is a second network bridge.

In a 11th exemplary aspect of the present disclosure, which may be used in combination with any one of more of the preceding aspects (i.e., the 1st aspect), where the device is a second computer system.

Aspects of the subject matter described herein may be useful alone or in combination with one or more other aspects described herein. In a 12st exemplary aspect of the present disclosure, a method includes receiving a message at a network bridge from a computer system, wherein the network bridge stores a forwarding table; determining a type of the message; upon a determination that the type of message is a network notification message, determining whether data within the message corresponds to an entry within the forwarding table; upon determining that the data within the message corresponds to the entry within the forwarding table, halting a transmission of the message; and upon determining that the data within the message does not correspond to the entry in the forwarding table, transmitting the message to a device in communication with the network bridge.

In a 13th exemplary aspect of the present disclosure, which may be used in combination with any one of more of the preceding aspects (i.e., the 12th aspect), where the message is a broadcast message including an invalid address as a destination address.

In a 14th exemplary aspect of the present disclosure, which may be used in combination with any one of more of the preceding aspects (i.e., the 12th aspect), where where determining whether data within the message corresponds to the entry within the forwarding table includes comparing the entry within the forwarding table with a source address and a arrival port associated with the message, wherein if the source address and the arrival port correspond to the entry within the forwarding table, the data within the message corresponds to the forwarding table.

In a 15th exemplary aspect of the present disclosure, which may be used in combination with any one of more of the preceding aspects (i.e., the 12th aspect), where the computer system is a virtual machine.

In a 16th exemplary aspect of the present disclosure, which may be used in combination with any one of more of the preceding aspects (i.e., the 12th aspect), where the network bridge is a switch.

In a 17th exemplary aspect of the present disclosure, which may be used in combination with any one of more of the preceding aspects (i.e., the 12th aspect), where determining that the data within the message corresponds to the entry within the forwarding table comprises determining whether the amount of time elapsed does not exceed a threshold time.

In a 18th exemplary aspect of the present disclosure, which may be used in combination with any one of more of the preceding aspects (i.e., the 12th aspect), where determining that the data within the message corresponds to the entry within the forwarding table comprising whether a counter within the forwarding table does not exceed the counter within the data.

In a 19th exemplary aspect of the present disclosure, which may be used in combination with any one of more of the preceding aspects (i.e., the 12th aspect), where the method further includes receiving a second message at the network bridge from a second computer system; determining whether the second message is a network notification message; upon a determination that the second message is a network notification message, determining whether data within the second message corresponds to a second entry within the forwarding table; upon determining that the data within the second message corresponds to the second entry within the forwarding table, halting a transmission of the second message; and upon determining that the data within the second message does not correspond to the second entry in the forwarding table, transmitting the second message to the device in communication with the network bridge.

In a 20th exemplary aspect of the present disclosure, which may be used in combination with any one of more of the preceding aspects (i.e., the 12th aspect), where the computer system sends the message upon moving from a first location to a second location with respect to the network bridge.

In a 21th exemplary aspect of the present disclosure, which may be used in combination with any one of more of the preceding aspects (i.e., the 12th aspect), where the device is a second network bridge.

In a 22th exemplary aspect of the present disclosure, which may be used in combination with any one of more of the preceding aspects (i.e., the 12th aspect), where the device is a second computer system.

Aspects of the subject matter described herein may be useful alone or in combination with one or more other aspects described herein. In a 23rd exemplary aspect of the present disclosure, a system includes a computer system; a network bridge in communication with the computer system, wherein the network bridge comprises a memory and a processor, the memory storing a forwarding table; a device in communication with the network bridge; and computer-executable program logic, encoded in the memory of the network bridge, wherein the computer-executable program logic is configured for the execution of: receiving a message from the computer system; determining a type of the message; upon a determination that the type of message is a network notification message, determining whether data within the message corresponds to an entry within a forwarding table; upon determining that the data within the message corresponds to the entry within the forwarding table, halting a transmission of the message; and upon determining that the data within the message does not correspond to the entry in the forwarding table, transmitting the message to the device.

In a 24th exemplary aspect of the present disclosure, which may be used in combination with any one of more of the preceding aspects (i.e., the 23rd aspect), where the message is a broadcast message including an invalid address as a destination address.

In a 25th exemplary aspect of the present disclosure, which may be used in combination with any one of more of the preceding aspects (i.e., the 23rd aspect), where determining whether data within the message corresponds to the entry within the forwarding table includes comparing the entry within the forwarding table with a source address and arrival port associated with the message, wherein if the source address and the arrival port correspond to the entry within the forwarding table, the data within the message corresponds to the forwarding table.

In a 26th exemplary aspect of the present disclosure, which may be used in combination with any one of more of the preceding aspects (i.e., the 23rd aspect), where determining that the data within the message corresponds to the entry within the forwarding table comprises determining whether the amount of time elapsed does not exceed a threshold time.

In a 27th exemplary aspect of the present disclosure, which may be used in combination with any one of more of the preceding aspects (i.e., the 23rd aspect), where determining that the data within the message corresponds to the entry within the forwarding table comprising whether a counter within the forwarding table does not exceed the counter within the data.

In a 28th exemplary aspect of the present disclosure, which may be used in combination with any one of more of the preceding aspects (i.e., the 23rd aspect), where the computer system is a virtual machine.

In a 29th exemplary aspect of the present disclosure, which may be used in combination with any one of more of the preceding aspects (i.e., the 23rd aspect), where the computer system sends the message upon moving from a first location to a second location with respect to the network bridge.

In a 30th exemplary aspect of the present disclosure, which may be used in combination with any one of more of the preceding aspects (i.e., the 23rd aspect), where the network bridge is a switch.

In a 31st exemplary aspect of the present disclosure, which may be used in combination with any one of more of the preceding aspects (i.e., the 23rd aspect), where the system further includes where the device is a second network bridge, where the second network bridge comprises a second memory, second processor, and stores a second forwarding table; and a second computer-executable program logic, encoded in the memory of the second network bridge, wherein the second computer-executable program logic is configured for the execution of: receiving a message from the network bridge; determining a type of the message from the network bridge; upon a determination that the type of the message from the network bridge is a network notification message, determining whether the data within the message from the network bridge corresponds to an entry within the second forwarding table; upon determining that the data within the message from the network bridge corresponds to the entry from the second forwarding table, halting a transmission of the message from the network bridge; and upon determining that the data within the message does not correspond to the entry in the second forwarding table, transmitting the message from the network bridge.

In a 32nd exemplary aspect of the present disclosure, which may be used in combination with any one of more of the preceding aspects (i.e., the 23rd aspect), where the system also includes a first server in communication with the network bridge, wherein the server hosts a virtual machine; a second server in communication with the network bridge; and wherein upon the virtual machine moving from the first server to the second server, the network bridge receives a network notification message from the virtual machine.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method, comprising: receiving a message at a network bridge from a computer system, wherein the network bridge stores a forwarding table; determining a type of the message; upon a determination that the type of message is a network notification message, determining whether data within the message corresponds to an entry within the forwarding table, wherein determining whether the data within the message corresponds to the entry within the forwarding table comprises determining whether a counter within the forwarding table does not exceed a counter within the data; upon determining that the data within the message corresponds to the entry within the forwarding table, halting a transmission of the message; and upon determining that the data within the message does not correspond to the entry in the forwarding table, transmitting the message to a device in communication with the network bridge.

2. The method of claim 1, wherein the message is a broadcast message including an invalid address as a destination address.

3. The method of claim 1, wherein determining whether the data within the message corresponds to the entry within the forwarding table comprises:
    comparing the entry within the forwarding table with a source address and a arrival port associated with the message, wherein if the source address and the arrival port correspond to the entry within the forwarding table, the data within the message corresponds to the forwarding table.

4. The method of claim 1, wherein the computer system is a virtual machine.

5. The method of claim 1, wherein the network bridge is a switch.

6. The method of claim 1, wherein determining whether the data within the message corresponds to the entry within the forwarding table comprises determining whether an amount of time elapsed does not exceed a threshold time.

7. The method of claim 1, further comprising:
    receiving a second message at the network bridge from a second computer system;
    determining whether the second message is a network notification message;
    upon a determination that the second message is a network notification message, determining whether data within the second message corresponds to a second entry within the forwarding table;
    upon determining that the data within the second message corresponds to the second entry within the forwarding table, halting a transmission of the second message; and
    upon determining that the data within the second message does not correspond to the second entry in the forwarding table, transmitting the second message to the device in communication with the network bridge.

8. The method of claim 1, wherein the computer system sends the message upon moving from a first location to a second location with respect to the network bridge.

9. The method of claim 1, wherein the device is a second network bridge.

10. The method of claim 1, wherein the device is a second computer system.

11. A non-transitory machine readable medium storing code, which when executed by a processor is configured to:
receive a message at a network bridge from a computer system, wherein the network bridge stores a forwarding table;
determine a type of the message;
upon a determination that the type of message is a network notification message, determine whether data within the message corresponds to an entry within the forwarding table, wherein determining whether the data within the message corresponds to the entry within the forwarding table comprises determining whether a counter within the forwarding table does not exceed a counter within the data;
upon determining that the data within the message corresponds to the entry within the forwarding table, halt a transmission of the message; and
upon determining that the data within the message does not correspond to the entry in the forwarding table, transmit the message to a device in communication with the network bridge.

12. The non-transitory machine readable medium of claim 11, wherein the message is a broadcast message including an invalid address as a destination address.

13. The non-transitory machine readable medium of claim 11, wherein determining whether the data within the message corresponds to the entry within the forwarding table comprises:
comparing the entry within the forwarding table with a source address and arrival port associated with the message, wherein if the source address and the arrival port correspond to the entry within the forwarding table, the data within the message corresponds to the forwarding table.

14. The non-transitory machine readable medium of claim 11, wherein determining whether the data within the message corresponds to the entry within the forwarding table comprises determining whether an amount of time elapsed does not exceed a threshold time.

15. A system, comprising:
a computer system;
a network bridge in communication with the computer system, wherein the network bridge comprises a memory and a processor, the memory storing a forwarding table;
a device in communication with the network bridge; and
computer-executable program logic, encoded in the memory of the network bridge, wherein the computer-executable program logic is configured for the execution of:
receiving a message from the computer system;
determining a type of the message;
upon a determination that the type of message is a network notification message, determining whether data within the message corresponds to an entry within a forwarding table, wherein determining whether the data within the message corresponds to the entry within the forwarding table comprises detemrining whether a counter within the forwarding table does not exceed the counter within the data;
upon determining that the data within the message corresponds to the entry within the forwarding table, halting a transmission of the message; and
upon determining that the data within the message does not correspond to the entry in the forwarding table, transmitting the message to the device.

16. The system of claim 15, wherein determining whether the data within the message corresponds to the entry within the forwarding table comprises:
comparing the entry within the forwarding table with a source address and arrival port associated with the message, wherein if the source address and the arrival port correspond to the entry within the forwarding table, the data within the message corresponds to the forwarding table.

17. The system of claim 15, wherein determining whether the data within the message corresponds to the entry within the forwarding table comprises determining whether an amount of time elapsed does not exceed a threshold time.

* * * * *

UNITED STATES PATENT AND TRADEMARK OFFICE
CERTIFICATE OF CORRECTION

| | |
|---|---|
| PATENT NO. | : 11,356,363 B2 |
| APPLICATION NO. | : 16/831256 |
| DATED | : June 7, 2022 |
| INVENTOR(S) | : Michael Tsirkin |

It is certified that error appears in the above-identified patent and that said Letters Patent is hereby corrected as shown below:

In the Claims

In Column 14, Line 24 (Claim 15), replace "detemrining" with -- determining --.

In Column 14, Line 25 (Claim 15), replace "the counter" with -- a counter --.

Signed and Sealed this
Thirteenth Day of September, 2022

Katherine Kelly Vidal
*Director of the United States Patent and Trademark Office*